(12) United States Patent
Chijiwa et al.

(10) Patent No.: US 12,038,594 B2
(45) Date of Patent: Jul. 16, 2024

(54) LIGHT GUIDE PLATE, LIGHTING APPARATUS, AND DISPLAY APPARATUS

(71) Applicant: Stanley Electric Co., Ltd., Tokyo (JP)

(72) Inventors: Kazumi Chijiwa, Tokyo (JP); Yoji Oki, Tokyo (JP); Takeshi Asakura, Tokyo (JP); Atsushi Kurita, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/245,850

(22) PCT Filed: Aug. 30, 2021

(86) PCT No.: PCT/JP2021/031724
§ 371 (c)(1),
(2) Date: Mar. 17, 2023

(87) PCT Pub. No.: WO2022/059469
PCT Pub. Date: Mar. 24, 2022

(65) Prior Publication Data
US 2023/0341609 A1    Oct. 26, 2023

(30) Foreign Application Priority Data
Sep. 18, 2020    (JP) .................................. 2020-156989

(51) Int. Cl.
*F21V 8/00* (2006.01)
*G02F 1/1335* (2006.01)

(52) U.S. Cl.
CPC ......... *G02B 6/0053* (2013.01); *G02B 6/0031* (2013.01); *G02B 6/0068* (2013.01);
(Continued)

(58) Field of Classification Search
CPC .. G02B 6/0033; G02B 6/0053; G02B 6/0031; G02B 6/0088; G02B 6/0068; G02B 6/0091
See application file for complete search history.

(56) References Cited

U.S. PATENT DOCUMENTS

| | | | |
|---|---|---|---|
| 11,656,473 B2 * | 5/2023 | Takata | .................. B60K 37/02 359/630 |
| 2009/0073347 A1 * | 3/2009 | Takahashi | ............ G02B 6/0038 349/65 |

(Continued)

FOREIGN PATENT DOCUMENTS

| | | |
|---|---|---|
| JP | 2002-277872 A | 9/2002 |
| JP | 2013-206577 A | 10/2013 |
| WO | 2022/059469 A1 | 3/2022 |

OTHER PUBLICATIONS

International Search Report and Written Opinion of the International Search Report for PCT/JP2021/031724 dated Oct. 12, 2021.

*Primary Examiner* — Christopher E Dunay
(74) *Attorney, Agent, or Firm* — KENEALY VAIDYA LLP

(57) ABSTRACT

To provide a light guide plate with reduced luminance unevenness. The light guide plate includes: a base portion having a one surface and a light incident surface disposed on one end side of the one surface and intersecting the one surface, and a plurality of convex lenses provided on a side facing the one surface of the base portion, each of the plurality of convex lenses extending in a first direction and aligned along a second direction which is substantially orthogonal to the first direction, where the base portion includes at least a first region relatively close to the light incident surface and a second region relatively far from the light incident surface, and where the first region is provided with a plurality of first bottom portions that are surfaces (Continued)

disposed between the convex lenses adjacent to each other in the second direction and inclined with respect to the first direction.

18 Claims, 9 Drawing Sheets

(52) U.S. Cl.
 CPC ......... *G02B 6/0088* (2013.01); *G02B 6/0091* (2013.01); *G02F 1/133524* (2013.01)

(56) References Cited

U.S. PATENT DOCUMENTS

| | | | |
|---|---|---|---|
| 2013/0242231 A1* | 9/2013 | Kurata .................. | G02B 6/0018 |
| | | | 349/65 |
| 2016/0041328 A1* | 2/2016 | Chang ................... | G02B 6/002 |
| | | | 362/606 |
| 2017/0336551 A1* | 11/2017 | Chang ................... | H05K 1/181 |
| 2017/0343722 A1* | 11/2017 | Weng .................... | G02B 6/0038 |
| 2019/0094446 A1* | 3/2019 | Kim ...................... | G02B 6/0036 |

* cited by examiner

LIGHT GUIDE PLATE, LIGHTING APPARATUS, AND DISPLAY APPARATUS

This application is a U.S. National Stage Application under 35 U.S.C § 371 of International Patent Application No. PCT/JP2021/031724 filed Aug. 30, 2021, which claims the benefit of priority to Japanese Patent Application No. 2020-156989 filed Sep. 18, 2020, the disclosures of all of which are hereby incorporated by reference in their entireties.

TECHNICAL FIELD

The present disclosure relates to a light guide plate, a lighting apparatus, and a display apparatus.

BACKGROUND ART

Japanese Unexamined Patent Application Publication No. 2013-206577 discloses a light guide plate having a first optical element with a light rising pattern on a first main surface and a second optical element with a light confinement lens on a second main surface, where the light guide plate includes air bubbles of appropriate size and appropriate volume inside the second optical element or from the inside of the second optical element up to a position with a distance equivalent to the height of the second optical element at a lower layer of the second optical element. However, it seems relatively difficult to appropriately control the size and degree of dispersion of the air bubbles when manufacturing the light guide plate.

PRIOR ART DOCUMENT

Patent Document

Patent Document 1: Japanese Unexamined Patent Application Publication No. 2013-206577

SUMMARY OF THE INVENTION

Technical Problem

In a specific aspect, it is an object of the present disclosure to provide a light guide plate or the like with reduced luminance unevenness.

Solution to the Problem (1) A light guide plate according to one aspect of the present disclosure includes (a) a base portion having a one surface and a light incident surface disposed on one end side of the one surface and intersecting the one surface, and (b) a plurality of convex lenses provided on a side facing the one surface of the base portion, each of the plurality of convex lenses extending in a first direction and aligned along a second direction which is substantially orthogonal to the first direction, (c) where the base portion includes at least a first region relatively close to the light incident surface and a second region relatively far from the light incident surface, and (d) where the first region is provided with a plurality of first bottom portions that are surfaces disposed between the convex lenses adjacent to each other in the second direction and inclined with respect to the first direction.

(2) A lighting apparatus according to one aspect of the present disclosure includes the light guide plate according to the above-described (1), a reflective sheet disposed on the one surface of the light guide plate, a condensing sheet sheet disposed on a light emission side of the light guide plate, and a plurality of light sources disposed to face the light incident surface of the light guide plate.

(3) A display apparatus according to one aspect of the present disclosure includes the lighting apparatus according to the above-described (2) and a liquid crystal panel disposed on the light emission side of the lighting apparatus.

According to the present disclosure, a light guide plate, a lighting apparatus, and a display apparatus with reduced luminance unevenness can be achieved.

MODE FOR CARRYING OUT THE INVENTION

Figure 1:
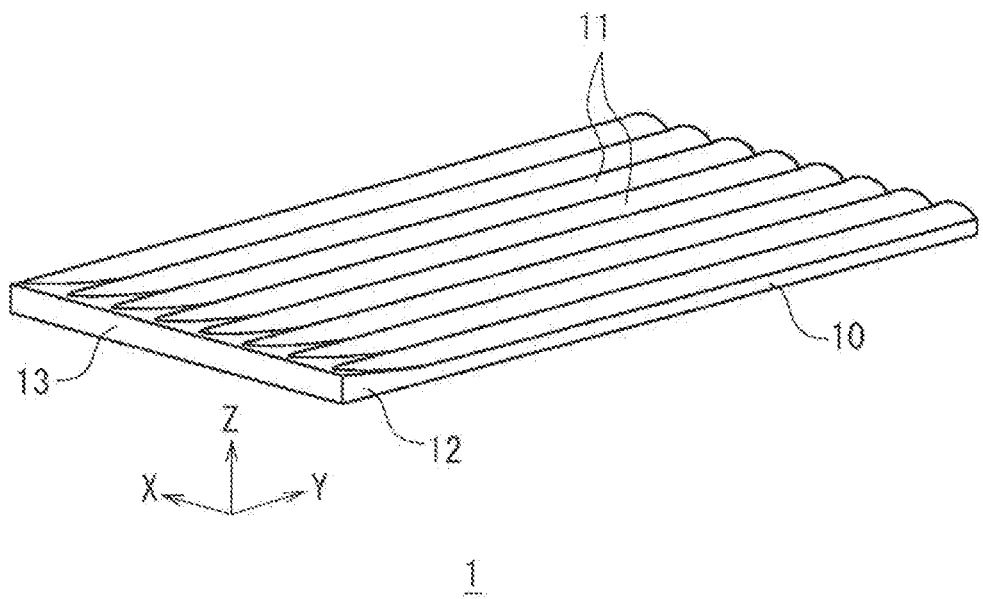
FIG. 1 is a perspective view of a light guide plate according to a first embodiment.

FIG. 1 is a perspective view of a light guide plate according to a first embodiment. The illustrated light guide plate (light guide sheet) 1 is configured to include a base portion and a plurality of convex lenses 11. The light guide plate 1 of the present embodiment guides light incident from the light incident surface 13 of the base portion 10, and emits planar light upward in the figure through the upper surface (emitting surface) of each convex lens 11. The light guide plate 1 is made of a light transmissive material and has a transparent flat plate shape (or a film shape). The material constituting the light guide plate 1 is not particularly limited as long as it is light transmissive. For example, various resin materials (acrylic resin as an example) having a refractive index of about 1.5 to 1.75 are suitably used.

The base portion 10 has a lower surface (one surface) having a flat portion, a light incident surface 13 arranged substantially orthogonal to the lower surface, and a tapered portion 12, and has a flat plate shape which spreads in X and Y directions in the FIG. and has a thickness in the Z direction. In this embodiment, the base portion 10 has a relatively longer length in the Y direction compared to the length in the X direction, but the length is not limited thereto, and the plan view shape is not limited to a rectangular shape. Here, in this specification, "substantially orthogonal" does not necessarily mean that the intersection is strictly at an angle of 90°, but allows for manufacturing errors, etc., and for example, "substantially orthogonal" herein includes intersecting in the range of 90°±10°. Further, the one surface described above may have a light extraction structure where the light which emits from the light source and enters from the light incident surface 13 and travels toward the one surface is reflected to the emitting surface side. For example, a fine shape (light extraction structure) as disclosed in Japanese Patent No. 5313098 or Japanese Patent No. 6184205 can be applied.

Each of the plurality of convex lenses 11 has a semi-cylindrical shape extending in the Y direction in the figure, and is arranged along the X direction which is substantially orthogonal to the Y direction. Although the light guide plate 1 of this embodiment has eight convex lenses 11, the number of convex lenses 11 is not limited. In the figure, only a few convex lenses 11 are denoted by reference numerals (the same applies to FIG. 2, which will be described later). Each convex lens 11 is provided on a side (an upper surface side) opposing the lower surface of the base portion 10, and is disposed so that the top faces upward in the figure (in the Z direction), and each ridgeline extends along the Y direction. In this embodiment, the convex lenses 11 are disposed such that the heights of the tops (the highest positions in the Z direction) of each of the convex lenses 11 with respect to the lower surface of the base portion 10 are substantially the same. Further, the height of the top of each convex lens 11 with respect to the lower surface of the base portion 10 is substantially constant along the Y direction. Further, the length (lens width) along the X direction of each convex lens 11 is substantially the same. A lens composed of such a plurality of convex lenses 11 is also called a lenticular lens.

The tapered portion 12 is disposed on one end side in the Y direction of the base portion 10, and closer to the light incident surface 13. The tapered portion 12 has a wedge shape with an inclined upper surface side so that the thickness (the height in the Z direction) increases as it approaches the light incident surface 13. The bottom surface of the tapered portion 12 is a common surface with the bottom surface of the base portion 10. The height of the tapered portion 12 with respect to the lower surface of the base portion 10 is approximately the same as the height of each convex lens 11 at the position of the light incident surface 13. Each convex lens 11 apparently sinks into the interior of the tapered portion 12 as it approaches the light incident surface 13 of the base portion 10.

The light incident surface 13 is provided on one end side in the Y direction of the base portion 10. The light incident surface 13 of this embodiment is a plane surface which is substantially parallel to the XZ plane and extends in the X direction. The light incident surface 13 is a surface for allowing light to enter into the light guide plate 1 from a light source such as an LED (not shown).

Figure 2:
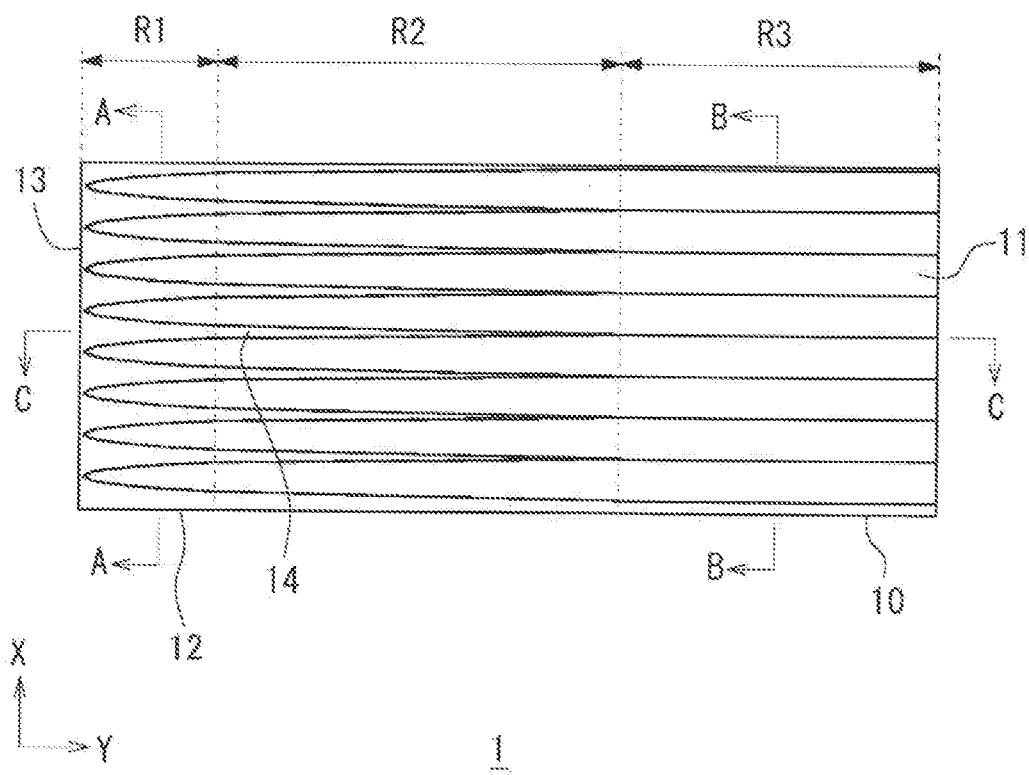
FIG. 2 is a plan view of the light guide plate according to the first embodiment as viewed from the upper surface side.

FIG. 2 is a plan view of the light guide plate according to the first embodiment as viewed from the upper surface side. The light guide plate 1 of the present embodiment is structurally divided into three regions R1, R2, and R3 arranged along the Y direction in a plan view. The first region R1 is a region which is relatively close to the light incident surface 13 and is a portion with a fixed distance (for example, several millimeters) in the Y direction, and corresponds to the tapered portion 12 described above. The second region R2 is a region which is relatively far from the light incident surface 13 and adjacent to the first region R1 in the Y direction. The third region R3 is a region which is adjacent to the second region R2 in the Y direction. For convenience of explanation, FIG. 2 may differ from the actual embodiment in terms of dimension and size. Further, the length in the Y direction of the third region R3 is appropriately adjusted according to the size of the display apparatus which will be described later.

In the first region R1, as described above, the height of each convex lens 11 is constant, whereas a bottom portion 14, which is the upper surface of the tapered portion 12, is provided at an angle. Thus, as shown in the plan view of the first region R1 in FIG. 2, the apparent width (length in the X direction) of each convex lens 11 gradually decreases as it approaches the light incident surface 13, and the width of each lens becomes 0 at the position of the light incident surface 13 (or at a fixed distance from the light incident surface 13). In other words, the plan view shape of each convex lens 11 within the first region R1 is a substantially triangular shape (or semi-elliptical shape) having one vertex at a position closest to the light incident surface 13.

In the second region R2, its upper surface is inclined more gently than that of the first region R1. As shown, the bottom portion 14 is arranged between each convex lens 11 in the X direction. These bottom portions 14 each extend along the Y direction in a plan view, and the width (the length in the X direction) of each bottom portion 14 decreases as the distance from the light incident surface 13 increases, and the width becomes 0 at the boundary between the second region R2 and the third region R3. Therefore, in a plan view, each bottom portion 14 has a narrow angle isosceles triangle shape elongated from the first region R1 to the second region R2.

In the third region R3, in a plan view, each bottom portion 14 between the convex lenses 11 is linear, and the lower ends of the convex lenses 11 are disposed to contact with each other in the X direction. Further, the bottom portion 14 of the third region R3 is not inclined and is parallel with respect to the Y direction. This third region R3 is the farthest region from the light incident surface 13 in the light guide plate 1.

Figure 3A:
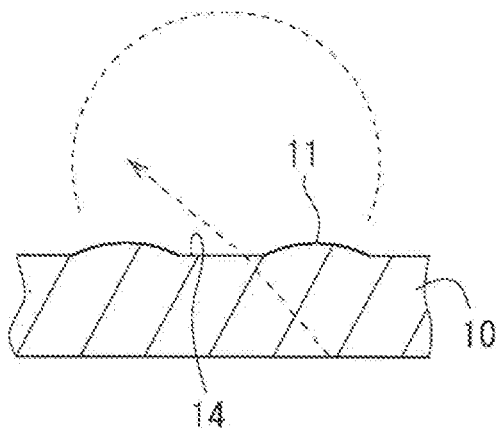
FIG. 3A is a partial cross-sectional view along line A-A shown in FIG. 2.
Figure 3B:
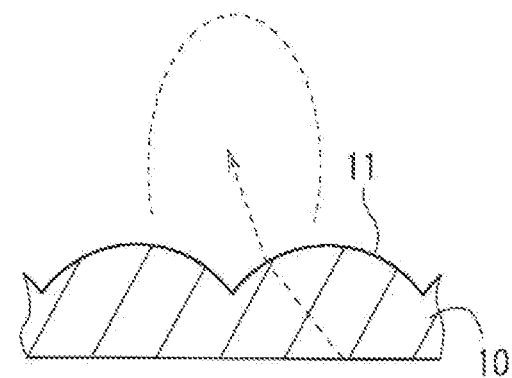
FIG. 3B is a partial cross-sectional view along line B-B shown in FIG. 2.
Figure 3C:
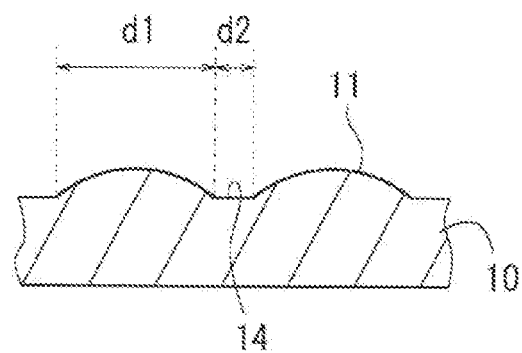
FIG. 3C is a diagram for explaining the ratio between each convex lens and the bottom portion.

FIG. 3A is a partial cross-sectional view along line A-A shown in FIG. 2. FIG. 3B is a partial cross-sectional view along line B-B shown in FIG. 2. FIG. 3C is a diagram for explaining the ratio between each convex lens and the bottom portion. As shown in FIG. 3A, in the first region R1, the width d2 of the bottom portion 14 is relatively large with respect to the width d1 of the convex lens 11. That is, the existence ratio of the convex lens 11 is reduced. As a result, the emission direction of the emitted light is widened. In other words, it can be said that light convergence in the vertical direction (Z direction) is reduced.

On the other hand, as shown in FIG. 3B, in the third region R3, the width d2 of the bottom portion 14 becomes 0 and the width d1 of the convex lens becomes relatively large. That is, the existence ratio of the convex lens 11 is increased. As a result, the emission direction of emitted light is narrowed. In other words, it can be said that the light convergence in the vertical direction is enhanced. Here, although not shown, the second region R2 has a light distribution characteristic that is intermediate between the light distribution characteristics of the first region R1 and the third region R3. In the second region R2 as a whole, the area ratio (existence ratio) in a plan view between each convex lens 11 and each bottom portion 14 adjacent thereto is preferably set between 6:4 and 9:1. This is because, according to a study carried out by the inventors of the present application, when the ratio of the bottom portion 14 is 4 or more (40% or more), reduction of luminance of the emitted light increases, whereas when the ratio of the bottom portion 14 is 1 or less (10% or less), the effect of spreading the emitted light becomes insufficient. That is, when the area ratio (existence ratio) in a plan view between each convex lens 11 and each bottom portion 14 adjacent thereto is within the above range, the luminance of the emitted light is sufficiently maintained and luminance unevenness that occurs in the vicinity of the light incident surface 13 can be reduced.

Figure 4A:
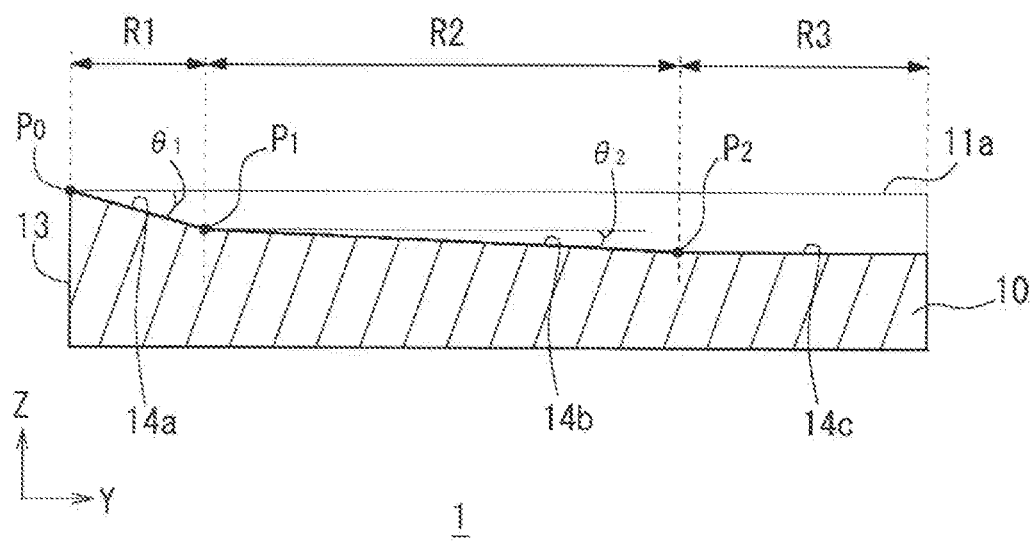
FIG. 4A is a cross-sectional view along line C-C shown in FIG. 2.

FIG. 4A is a cross-sectional view along line C-C shown in FIG. 2. Here, in FIG. 4A, in order to understand more easily the structure of the light guide plate 1, the size of the light guide plate 1 in the thickness direction (Z direction) is shown in an enlarged manner compared to the actual size. Here, with regard to the bottom portion 14 described above, the portion is separated into a bottom portion 14a (first bottom portion) which corresponds to the first region R1, a bottom portion 14b (second bottom portion) which corresponds to the second region R2, and a bottom portion 14c (third bottom portion) which corresponds to the third region R3.

In the first region R1, let $\theta_1$ be the tilt angle (first tilt angle) defined as the angle between the bottom portion 14a which is the upper surface of the tapered portion 12 and the Y direction. The tilt angle $\theta_1$ of the bottom portion 14a is constant from the starting point $P_0$ to an inflection point (change point) $P_1$ which corresponds to the boundary between the first region R1 and the second region R2. The bottom portion 14a is inclined so that the closer it is to the light incident surface 13, the greater the height becomes relative to the lower surface of the base portion 10.

In the second region R2, let $\theta_2$ be the tilt angle (second tilt angle) defined as the angle between the bottom portion 14b which is situated between the convex lenses 11 and the Y direction. The tilt angle $\theta_2$ is constant between the inflection point $P_1$ and the inflection point $P_2$. The inflection point $P_1$ corresponds to the boundary between the first region R1 and the second region R2, and the inflection point $P_2$ corresponds to the boundary between the second region R2 and the third region R3. That is, the tilt angle $\theta_2$ is constant throughout the second region R2. The bottom portion 14b is inclined so that the closer it is to the light incident surface 13, the greater the height becomes relative to the lower surface of the base portion 10. Here, in the first embodiment, the bottom portion 14b as a whole corresponds to a "first surface".

In the third region R3, each bottom portion 14c is linearly present between the convex lenses 11, and the linear bottom portions 14c are substantially parallel to the Y direction.

Figure 4B:
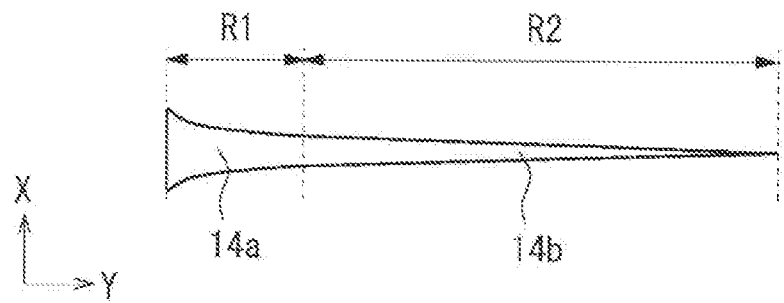
FIG. 4B shows a plan view shape of the bottom portions of the first region and the second region.

FIG. 4B shows a plan view shape of the bottom portions 14a and 14b of the first region R1 and the second region R2. As shown in the figure, as a whole, the plan view shape of the bottom 14 is an elongated isosceles triangular shape. In detail, the plan view shape of the bottom portion 14a is a substantial trapezoidal shape, where the width in the X direction increases as the bottom portion 14a becomes closer to the light incident surface 13, and both legs are curved. The bottom portion 14b is an elongated isosceles triangle shape with the inflection point $P_2$ as the vertex, where the width of the bottom portion 14b in the X direction increases as the bottom portion 14b becomes closer to the light incident surface 13.

Here, the tilt angles $\theta_1$ and $\theta_2$ will be further explained. As described above, the tilt angles $\theta_1$ and $\theta_2$ are defined as angles with respect to the Y direction. In this embodiment, the Y direction is parallel to the ridgeline 11a of each convex lens 11 and parallel to the lower surface of the base portion 10 of the light guide plate 1. Therefore, the tilt angles $\theta_1$ and $\theta_2$ can also be defined as angles with respect to the ridge lines 11a of the convex lenses 11 or the lower surface of the base portion 10 of the light guide plate 1. In the present embodiment, in a cross-sectional view, the angle formed by the Y direction of the bottom portion 14 extending from the first region R1 to the third region R3 via the second region R2 changes at two inflection points $P_1$ and $P_2$. Here, as shown in the figure, with regard to the tilt angles $\theta_1$ and $\theta_2$, there is a relationship of $\theta_1 > \theta_2$. In other words, the bottom portion 14a located closer to the light incident surface 13 is inclined at a larger angle with respect to the Y direction than the bottom portions 14b and 14c.

Here, according to a study carried out by the inventors of the present application, it is preferable that the tilt angle $\theta_1$ be set within a range of, for example, 0.5° or more and 5° or less. Further, the tilt angle $\theta_2$ is preferably set within a range of, for example, greater than 0° and 0.02° or less. Further, the Y-direction length $y_1$ from the light incident surface 13 to the inflection point $P_1$ is preferably set in a range of, for example, 0.1 mm or more and 5 mm or less, and the Y-direction length $y_2$ from the light incident surface 13 to the inflection point $P_2$ is preferably set within a range of, for example, 15 mm or more and 35 mm or less. As a suitable example, the tilt angle $\theta_1$ can be set to 2.7°, the tilt angle $\theta_2$ to 0.01°, the Y-direction length $y_1$ to 0.3 mm, and the Y-direction length $y_2$ to 20 mm.

Figure 5A:
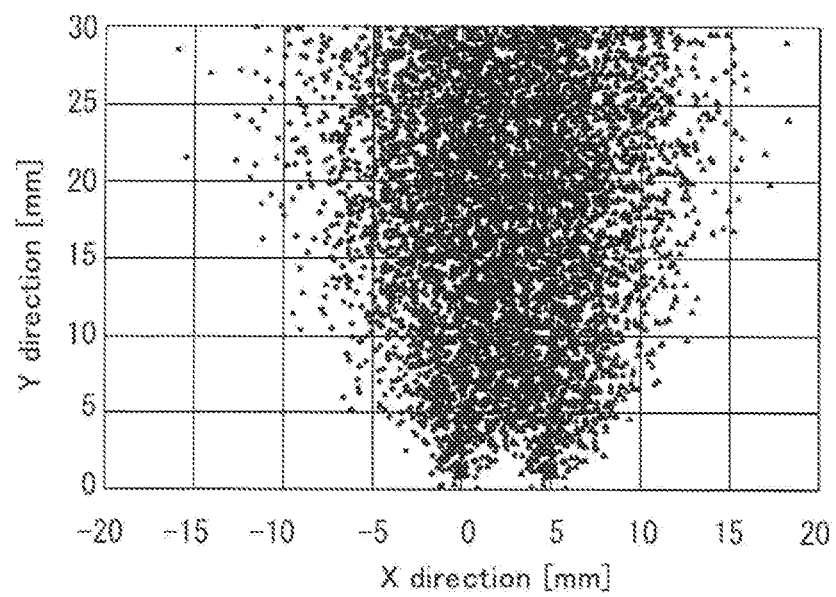
FIG. 5A is a diagram showing an example of light emission distribution of the light guide plate according to the first embodiment.
Figure 5B:
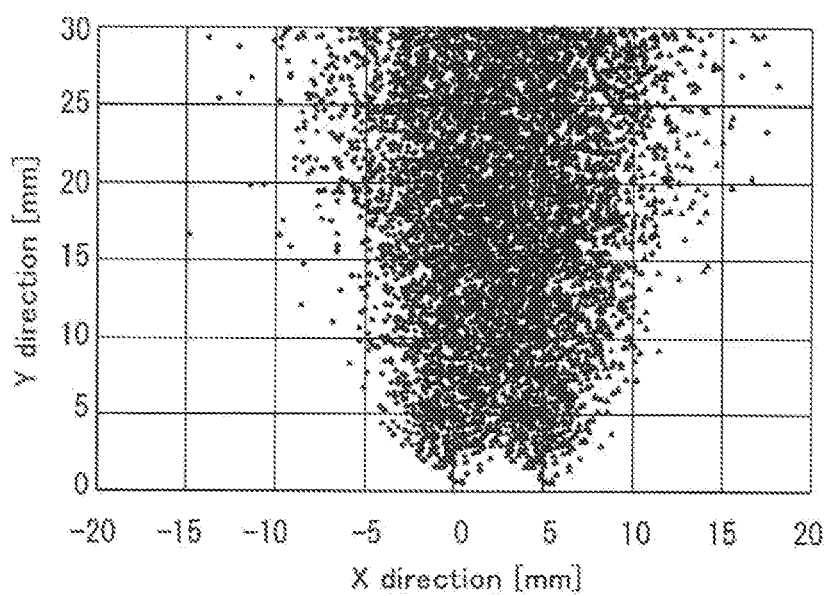
FIG. 5B is a light emission distribution diagram of a light guide plate of a comparative example.

FIG. 5A is a diagram showing an example of light emission distribution (that is, the distribution of light beam emission positions as viewed from the upper surface) of the light guide plate according to the first embodiment. Here, when the tilt angle $\theta_1$ is set to 2.7°, the tilt angle $\theta_2$ to 0.01°, the Y-direction length $y_1$ to 0.3 mm, the Y-direction length $y_2$ to 20 mm, and the total length of the light guide plate in the Y direction to 180 mm, light emission distribution of the light guide plate 1 within the range of 0 mm to 30 mm in the Y direction of the light guide plate 1 was obtained by simulation. Further, FIG. 5B is a light emission distribution diagram of a light guide plate of a comparative example. Here, a light guide plate whose entire upper surface side has the same configuration as the third region R3 (d2=0; refer to FIG. 3B) while not providing a first region R1 and a second region R2 as described in the above embodiment, is illustrated as a comparative example. Further, for each of the light guide plates, LEDs as light sources are provided at respective positions of 0 mm and 5 mm in the X direction. Further, the position of Y=0 mm corresponds to the position of the light incident surface 13. Further, each light beam emission position is drawn as a small dot in the figure.

In the light guide plate 1 of the present embodiment, in comparison with the light guide plate of the comparative example, in the range of about 0 to 5 mm in length in the Y direction, that is, in the range close to the light source, the light emission distribution becomes such that the light spreads gently in a trapezoidal shape in the X direction. This is mainly the effect of the first region R1. As a result, the effect of suppressing the occurrence of so-called hot spot phenomenon can be achieved. This effect tends to be too strong when the tilt angle $\theta_1$ is greater than 5°, and tends to be insufficient when the tilt angle $\theta_1$ is less than 0.5°. In other words, if the tilt angle $\theta_1$ is greater than 5°, then the effect of light extraction function becomes stronger than necessary and hot spot phenomenon occurs directly above the light incident surface 13, and if the tilt angle $\theta_1$ is smaller than 0.5°, then the light extraction function is weakened, thereby the emitted light is emphasized at the intersection point between the adjacent light sources and tends to cause hot spot phenomenon. Therefore, it is preferable to set the tilt angle $\theta_1$ within the range of the numerical example described above. The hot spot phenomenon referred to here is a phenomenon in which emitted light is emphasized at intersections of lights traveling in oblique directions from each of the point-light sources adjacent to the light incident surface 13, or a phenomenon in which the emitted light directly above the light incident surface 13 is emphasized and deteriorates the appearance. According to a study carried out by the inventors of the present application, mainly due to the effect of the first region R1, the light component traveling from the light source in the direction of 60° to 75° in terms of absolute value with respect to the Y direction is reduced, and thereby, suppression of hot spot phenomenon is confirmed. Further, since the non-light emission region between the light sources becomes smaller, the effect of suppressing brightness unevenness of emitted light is also confirmed. Furthermore, mainly due to the effect of the second region R2, in a region where Y is 5 mm or more, that is, in a region which should be the main light emission region in the light guide plate 1, a light emission distribution spreading in the X direction is confirmed.

Figure 6A:
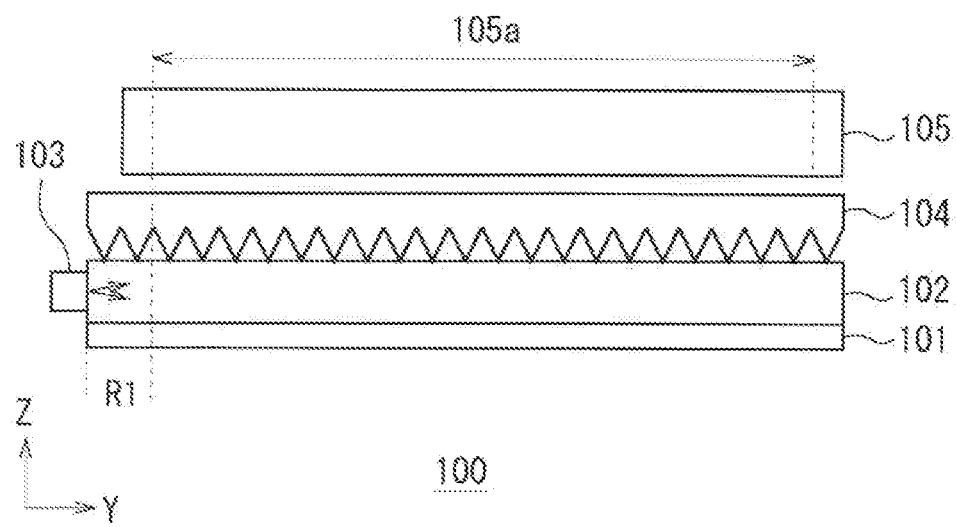
FIG. 6A is a schematic side view showing a configuration example of a lighting apparatus according to one embodiment and a display apparatus including the lighting apparatus.

FIG. 6A is a schematic side view showing a configuration example of a lighting apparatus according to one embodiment and a display apparatus including the lighting apparatus. The illustrated display apparatus 100 is configured to include a reflective sheet 101, a light guide plate 102, a light source 103, a prism sheet 104 and a liquid crystal panel 105. The light guide plate 102 is the same as the light guide plate 1 according to the embodiment described above. The lighting apparatus is configured to include a reflective sheet 101, a light guide plate 102, a light source 103 and a prism sheet (condensing sheet) 104. Here, the shown configuration is merely an example, and it does not prevent other configurations from being added.

The reflective sheet 101 reflects the light emitted from the lower surface side of the light guide plate 102 and returns it to the light guide plate 102. The light guide plate 102 guides the light incident from the light source 103 and emits it to the upper surface side. The light source 103 is, for example, a semiconductor light emitting device such as an LED or a laser, and causes light to enter into the light guide plate 102 from an incident surface on one end side of the light guide plate 102. Although the number of light sources 103 is not particularly limited, at least two or more light sources 103 are arranged side by side in the depth direction of the paper surface. Further, the light source 103 may be a fluorescent tube, a cold cathode tube, a hot cathode tube, an external electrode tube, an organic EL, an inorganic EL, or the like. The prism sheet 104 collects light emitted from the upper surface side of the light guide plate 102. Note that a condensing sheet having a similar condensing function may be used instead of the prism sheet 104. The liquid crystal panel 105 has a plurality of pixel regions (light modulation regions), and by arbitrarily increasing or decreasing the light transmittance in each pixel region, it can form an image by the emitted light.

Figure 6B:
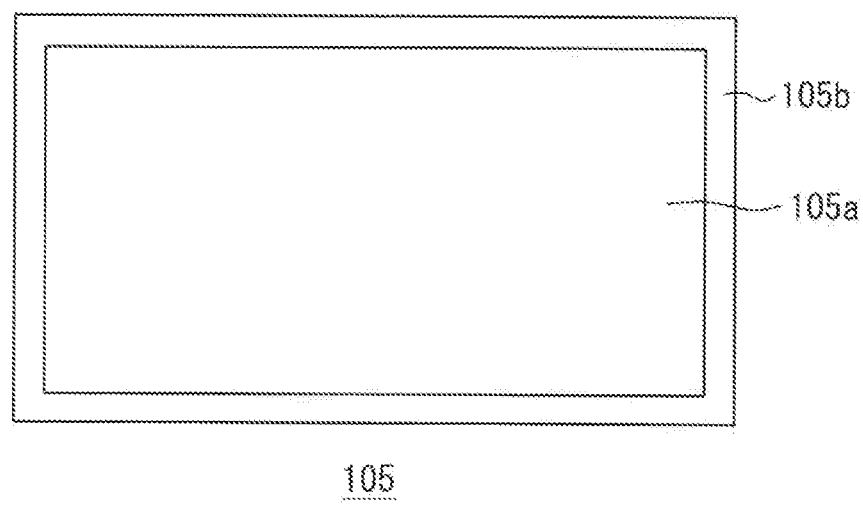
FIG. 6B is a schematic plan view for explaining the structure of a liquid crystal panel.

FIG. 6B is a schematic plan view for explaining the structure of the liquid crystal panel. As shown in the figure, the liquid crystal panel 105 includes a display portion 105a which has the above-described plurality of pixel regions and contributes to image formation and a peripheral portion 105b which annularly surrounds the display portion 105a. In the peripheral portion 105b, drivers and the like used to drive the display portion 105a are disposed. In the display apparatus 100 of the present embodiment, as shown in FIG. 6A, the relative positional relation between the liquid crystal panel 105 and the light guide plate 102 is set so that the first region R1 (refer to FIG. 2) of the light guide plate 102 is arranged outside the display portion 105a of the liquid crystal panel 105.

According to the above-described embodiment, a light guide plate, a lighting apparatus, and a display apparatus with reduced luminance unevenness can be achieved.

The present disclosure is not limited to the contents of the above-described embodiment, and can be variously modified and implemented within the scope of the gist of the present disclosure. For example, although the light guide plate 1 of the embodiment described above has three regions R1 to R3, the third region R3 may be omitted. In this case, the second region R2 extends to the other end side of the light guide plate 1. Further, the configuration of the bottom portion of the light guide plate is not limited to the above embodiment. Several other embodiments will be described hereinafter.

Figure 7A:
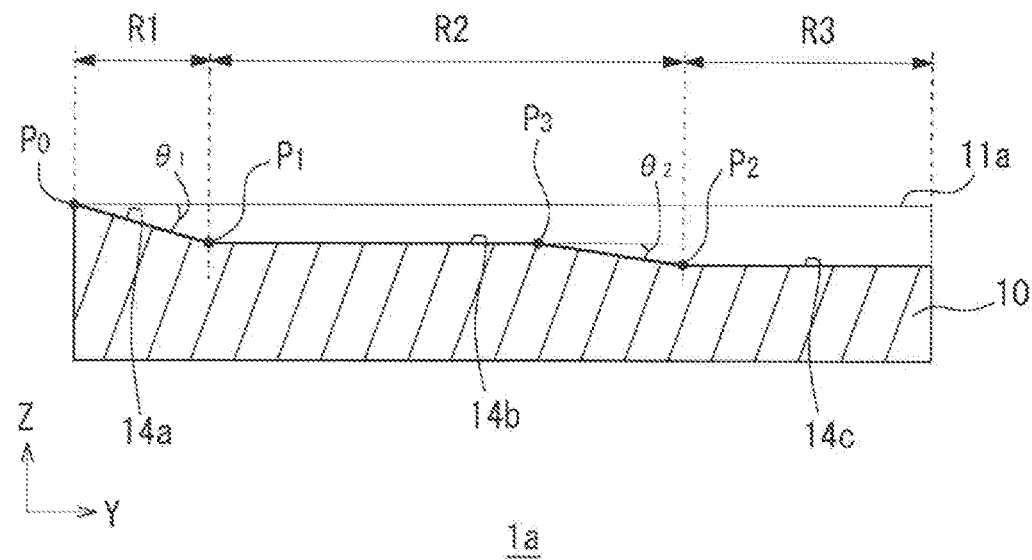
FIG. 7A is a cross-sectional view of a light guide plate according to a second embodiment.

FIG. 7A is a cross-sectional view of a light guide plate according to a second embodiment. As with FIG. 4A, this cross-sectional view also corresponds to the C-C line shown in FIG. 2 and the size of the light guide plate in the thickness direction (Z direction) is shown in an enlarged manner compared to the actual size. The light guide plate 1a of the second embodiment differs from the above-described first embodiment in that it has an inflection point within the region of the bottom portion 14b in the second region R2, but the other configuration is the same. In detail, in the light guide plate 1a of the second embodiment, an inflection point $P_3$ is added between the inflection point $P_1$ and the inflection point $P_2$, and the bottom portion 14b is arranged as a plane surface substantially parallel to the Y direction between the inflection point $P_1$ and the inflection point $P_3$, and is inclined at an tilt angle $\theta_2$ with respect to the Y direction between the inflection point $P_3$ and the inflection point $P_2$. Here, in the bottom portion 14b of the second embodiment, the surface between the inflection point $P_1$ and the inflection point $P_3$ corresponds to a "third surface", and the surface between the inflection point $P_3$ and the inflection point $P_2$ corresponds to a "first surface".

Figure 7B:
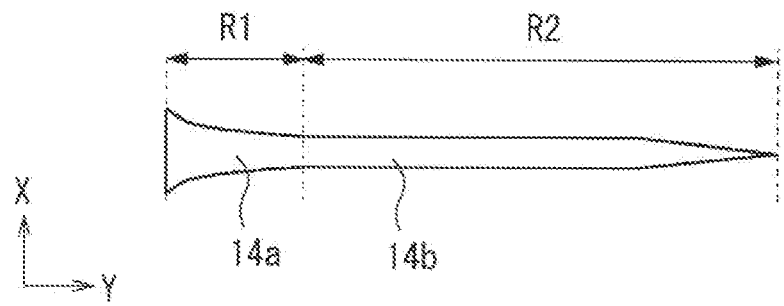
FIG. 7B is a diagram showing a a plan view shape of bottom portions of a first region and a second region.

FIG. 7B is a diagram showing a plan view shape of the bottom portions of the first region and the second region. The bottom portion 14a of the first region R1 has the same plan view shape as with the above-described embodiment. On the other hand, the bottom portion 14b of the second region R2 has a substantially rectangular plan view shape between the inflection point $P_1$ and the inflection point $P_3$ and an isosceles triangle shape between the inflection point $P_3$ and the inflection point $P_2$, and as a whole, has a plan view shape in which a rectangle and an isosceles triangle are connected in the Y direction. Even with the light guide plate 1a of the second embodiment, the same effect as that of the light guide plate 1 of the first embodiment can be achieved. Further, as with the light guide plate 1 of the first embodiment, the light guide plate 1a can be used as a component of a lighting apparatus and a display apparatus (refer to FIG. 6A).

Figure 8A:
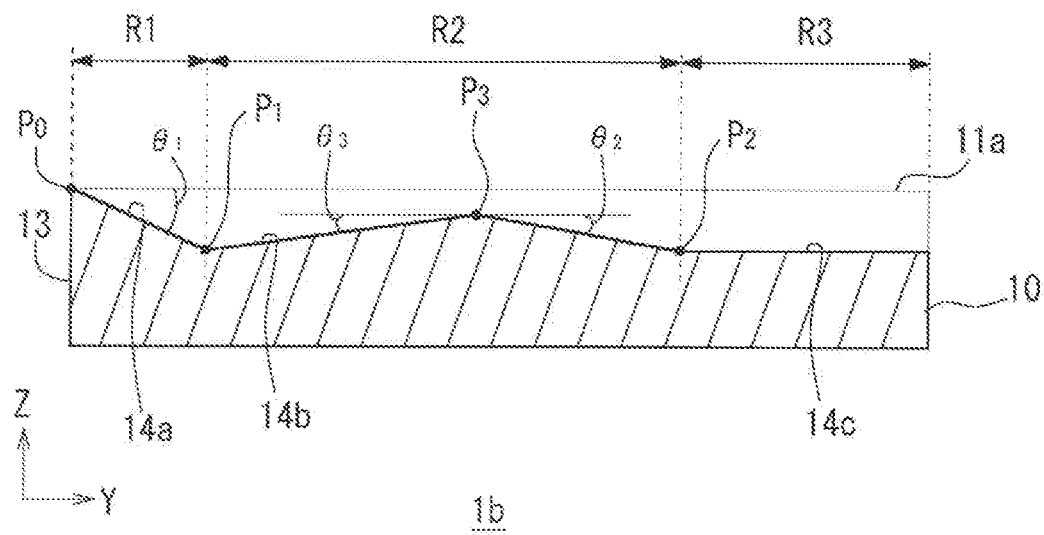
FIG. 8A is a cross-sectional view of a light guide plate according to a third embodiment.

FIG. 8A is a cross-sectional view of a light guide plate according to a third embodiment. As with FIG. 4A described above, this cross-sectional view also corresponds to the C-C line shown in FIG. 2, and the size in the thickness direction (Z direction) of the light guide plate is shown in an enlarged manner compared to the actual size. The light guide plate 1b of the third embodiment differs from the above-described first embodiment in that the bottom portion 14b of the second region R2 has two portions, but the other configuration is the same. In detail, as with the light guide plate 1a of the second embodiment, in the light guide plate 1b of the third embodiment, an inflection point $P_3$ is added between the inflection point $P_1$ and the inflection point $P_2$.

In the third embodiment, the bottom portion 14b is inclined at an tilt angle $\theta_3$ with respect to the Y direction from the inflection point $P_1$ to the inflection point $P_3$ and is inclined at an tilt angle $\theta_2$ with respect to the Y direction from the inflection point $P_3$ to the inflection point $P_2$. The inflection point $P_1$ and the inflection point $P_2$ have the same height in the Z direction, and the tilt angles $\theta_2$ and $\theta_3$ also have the same value. The portion of the bottom portion 14b between the inflection point $P_1$ and the inflection point $P_3$ is inclined so that the height increases along the Z direction, and the portion between the inflection point $P_3$ and the inflection point $P_2$ is inclined so that the height decreases along the Z direction. Here, in the bottom portion 14b of the third embodiment, the surface between the inflection point $P_1$ and the inflection point $P_3$ corresponds to a "second surface", and the surface between the inflection point $P_3$ and the inflection point $P_2$ corresponds to a "first surface".

Figure 8B:
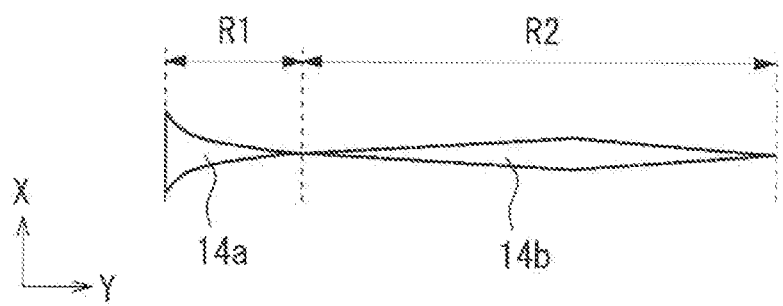
FIG. 8B is a diagram showing a plan view shape of bottom portions of a first region and a second region.

FIG. 8B is a diagram showing a plan view shape of the bottom portions of the first region and the second region. The bottom portion 14a of the first region R1 has a substantially triangular shape. This is because the convex lenses 11 are in contact with each other in the X direction at the position of the inflection point $P_1$, and therefore d2=0 is realized. Further, the bottom portion 14b of the second region R2 has an isosceles triangle shape between the inflection point $P_1$ and the inflection point $P_3$, having an acute angle on the left side in the figure, and has an isosceles triangle shape between the inflection point $P_3$ and the inflection point $P_2$, having an acute angle on the right side in the figure, and as a whole, in a plan view, it has a rhomboid shape elongated along the Y direction. Even with the light guide plate 1b of the third embodiment, the same effect as that of the light guide plate 1 of the first embodiment can be achieved. In particular, by providing the inflection point $P_1$ with d2=0, the light extraction efficiency in the vicinity of the light incident surface (inflection point $P_1$ portion) is increased, and brightness unevenness can be suppressed, thereby enhancing the effect of suppressing the hot spot phenomenon. Further, as with the light guide plate 1 of the first embodiment, the light guide plate 1b can be used as a component of a lighting apparatus and a display apparatus (refer to FIG. 6A).

Figure 9A:
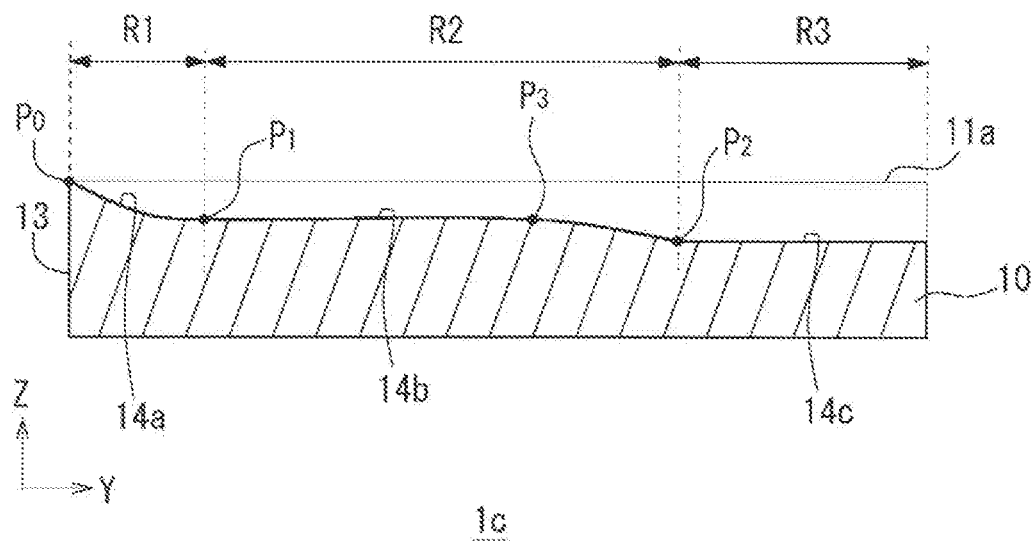
FIG. 9A is a cross-sectional view of a light guide plate according to a fourth embodiment.

FIG. 9A is a cross-sectional view of a light guide plate according to a fourth embodiment. As with FIG. 4A, this cross-sectional view also corresponds to the C-C line shown in FIG. 2, and the size in the thickness direction (Z direction) of the light guide plate is shown in an enlarged manner compared to the actual size. The light guide plate 1c of the fourth embodiment is obtained by forming a part of the bottom portion 14 of the light guide plate 1a of the second embodiment into a curved surface. In detail, the bottom portion 14a of the first region R1 is a curved surface between the starting point $P_0$ and the inflection point $P_1$. Further, the bottom portion 14b of the second region R2 is a curved surface between the inflection point $P_3$ and the inflection point $P_2$. Here, in the bottom portion 14b of the fourth embodiment, the surface between the inflection point $P_1$ and the inflection point $P_3$ corresponds to a "third surface", and the surface between the inflection point $P_3$ and the inflection point $P_2$ corresponds to a "first surface". Further, although detailed description is omitted, with regard to the light guide plate 1 of the first embodiment, the light guide plate 1b of the third embodiment, and the light guide plate 1d of the fifth embodiment which is to be described hereinafter, the bottom portion 14 may be similarly curved.

Figure 9B:
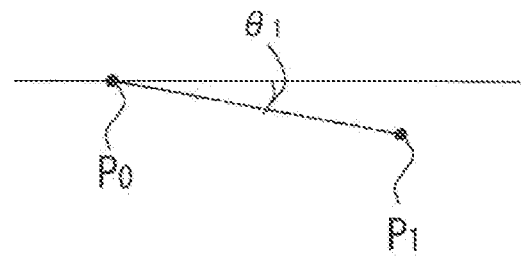
FIGS. 9B and 9C are diagrams for explaining an example of a method of defining the tilt angle of each curved surface.
Figure 9C:
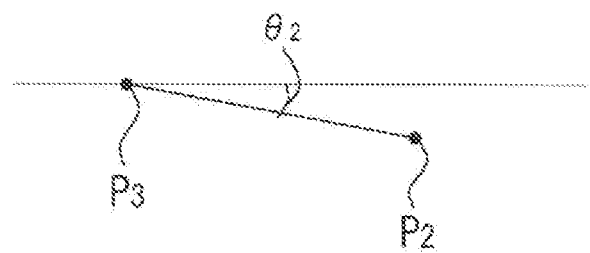

FIGS. 9B and 9C are diagrams for explaining an example of a method of defining the tilt angle of each curved surface. As shown in FIG. 9B, the tilt angle $\theta_1$ of the bottom portion 14a can be defined as the angle between the straight line connecting the starting point $P_0$ and the inflection point $P_1$, and the Y direction. Similarly, as shown in FIG. 9C, the tilt angle $\theta_2$ of the bottom portion 14b can be defined as the angle between the straight line connecting the inflection point $P_3$ and the inflection point $P_2$, and the Y direction. Thereby, average tilt angle of each curved surface can be obtained. Even with the light guide plate 1c of the fourth embodiment, the same effect as that of the light guide plate 1 of the first embodiment can be achieved. Further, as with the light guide plate 1 of the first embodiment, the light guide plate 1c can be used as a component of a lighting apparatus and a display apparatus (refer to FIG. 6A).

Figure 10A:
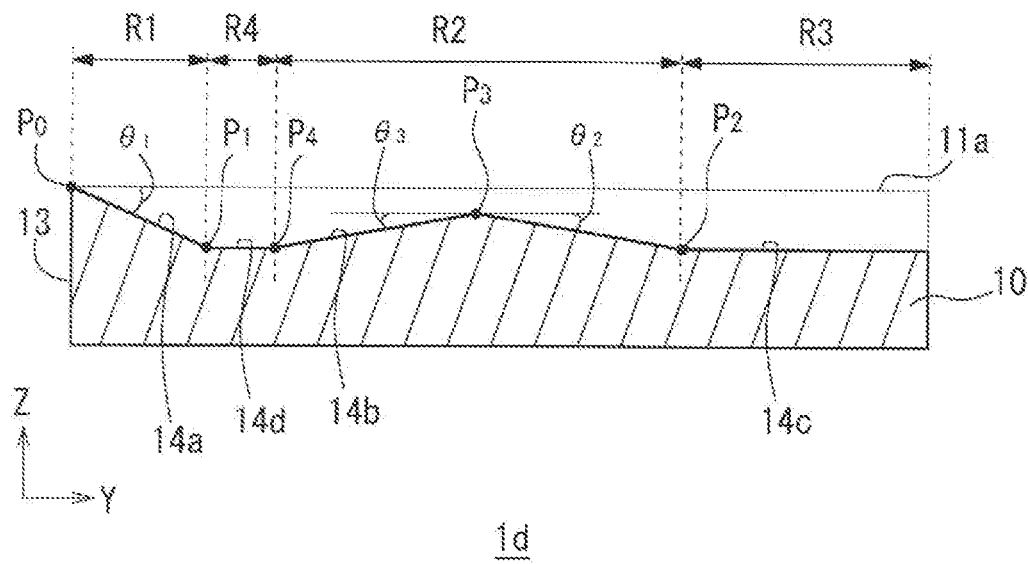
FIG. 10A is a cross-sectional view of a light guide plate according to a fifth embodiment.

FIG. 10A is a cross-sectional view of a light guide plate according to a fifth embodiment. As with FIG. 4A, this cross-sectional view also corresponds to the C-C line shown in FIG. 2, and the size in the thickness direction (Z direction) of the light guide plate is shown in an enlarged manner compared to the actual size. The light guide plate 1d of the fifth embodiment is obtained by newly providing a fourth region R4 between the first region R1 and the second region R2 to the light guide plate 1b of the third embodiment. In the fifth embodiment, the bottom portion 14b is inclined at an tilt angle $\theta_3$ with respect to the Y direction from the inflection point $P_4$ which corresponds to the boundary between the fourth region R4 and the second region R2, to the inflection point $P_3$, and is inclined at an tilt angle $\theta_2$ with respect to the Y direction from the inflection point $P_3$ to the inflection point $P_2$. The inflection point $P_1$ and the inflection point $P_2$ have the same height in the Z direction, and the tilt angles $\theta_2$ and $\theta_3$ have the same value. The portion of the bottom portion 14b between the inflection point $P_4$ and the inflection point $P_3$ is inclined so that the height increases along the Z direction, and the portion between the inflection point $P_3$ and the inflection point $P_2$ is inclined so that the height decreases along the Z direction. Further, in the fourth region R4, between the inflection point $P_1$ and the inflection point $P_4$, the bottom portion 14d is arranged parallel to the Y direction. Here, in the bottom portion 14b of the fifth embodiment, the surface between the inflection point $P_4$ and the inflection point $P_3$ corresponds to a "second surface", and the surface between the inflection point $P_3$ and the inflection point $P_2$ corresponds to a "first surface", and the surface between the inflection point $P_1$ and the inflection point $P_4$ corresponds to a "third surface".

Figure 10B:
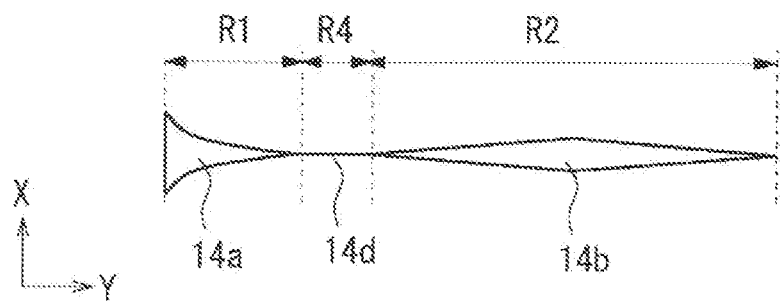
FIG. 10B is a diagram showing a plan view shape of bottom portions from a first region R1 to a second region R2.

FIG. 10B is a diagram showing a plan view shape of the bottom portions from the first region R1 to the second region R2. The embodiment is the same as the third embodiment except that the bottom portion 14d in the fourth region R4 has a linear configuration. In the fourth region R4, since the convex lenses 11 are in contact with each other in the X direction and d2=0 is realized, the bottom portion 14d becomes linear. The light guide plate 1d of the fifth embodiment can also provide the same effect as that of the light guide plate 1 of the first embodiment. In particular, by providing the fourth region R4, the light extraction efficiency in the vicinity of the light incident surface (the portion of the fourth region R4) is increased, and brightness unevenness can be suppressed, thereby enhancing the effect of suppressing the hot spot phenomenon. Further, as with the light guide plate 1 of the first embodiment, the light guide plate 1d can be used as a component of a lighting apparatus and a display apparatus (refer to FIG. 6A).

DESCRIPTION OF REFERENCE NUMERALS

1: Light guide plate
10: Base portion
11: Convex lens
12: Tapered portion
13: Light incident surface
14, 14a, 14b, 14c: Bottom portion
100: Display apparatus
101: Reflective sheet
102: Light guide plate
103: Light source
104: Prism sheet
105: Liquid crystal panel
R1: First region
R2: Second region
R3: Third region

The invention claimed is:

1. A light guide plate comprising:
a base portion having a one surface and a light incident surface disposed on one end side of the one surface and intersecting the one surface, and
a plurality of convex lenses provided on a side facing the one surface of the base portion, each of the plurality of convex lenses extending in a first direction and aligned along a second direction which is substantially orthogonal to the first direction,
wherein the base portion includes at least a first region relatively close to the light incident surface and a second region relatively far from the light incident surface,
wherein the first region is provided with a plurality of first bottom portions that are surfaces disposed between the convex lenses adjacent to each other in the second direction and inclined with respect to the first direction, and
wherein the plurality of convex lenses are provided within the first region.

2. The light guide plate according to claim 1,
wherein each of the plurality of first bottom portions is inclined so that the closer it is to the light incident surface, the higher the height relative to the one surface of the base portion.

3. The light guide plate according to claim 1,
wherein each of the plurality of first bottom portions has a shape in a plan view in which the closer it is to the light incident surface, the greater the width in the second direction.

4. The light guide plate according to claim 1,
wherein a first tilt angle which is an angle between each of the plurality of first bottom portions and the first direction, is 0.5° or more and 5° or less.

5. A lighting apparatus comprising:
the light guide plate according to claim 1;
a reflective sheet disposed on the one surface of the light guide plate;
a condensing sheet disposed on a light emission side of the light guide plate; and
a plurality of light sources disposed to face the light incident surface of the light guide plate.

6. A display apparatus comprising:
the lighting apparatus according to claim 5; and
a liquid crystal panel disposed on the light emission side of the lighting apparatus.

7. The display apparatus according to claim 6,
wherein the liquid crystal panel has a display portion that contributes to image formation and a peripheral portion that annularly surrounds the display portion, and
wherein the light guide plate is disposed so that the first region is disposed outside the display portion of the liquid crystal panel.

8. The light guide plate according to claim 1,
wherein the height of the light incident surface with respect to a lower surface of the base portion is the same as the height of each of the plurality of convex lenses at the position of the light incident surface.

9. The light guide plate according to claim 8,
wherein the heights of the top of each of the plurality of convex lenses with respect to a lower surface of the base portion is the same and is substantially constant along the first direction.

10. The light guide plate according to claim 1,
wherein the heights of the top of each of the plurality of convex lenses with respect to a lower surface of the base portion is the same and is substantially constant along the first direction.

11. A light guide plate comprising:
a base portion having a one surface and a light incident surface disposed on one end side of the one surface and intersecting the one surface, and
a plurality of convex lenses provided on a side facing the one surface of the base portion, each of the plurality of convex lenses extending in a first direction and aligned along a second direction which is substantially orthogonal to the first direction,
wherein the base portion includes at least a first region relatively close to the light incident surface and a second region relatively far from the light incident surface,
wherein the first region is provided with a plurality of first bottom portions that are surfaces disposed between the convex lenses adjacent to each other in the second direction and inclined with respect to the first direction,
wherein, in the second region, a plurality of second bottom portions which are surfaces respectively disposed between the convex lenses adjacent in the second direction are provided, and
wherein each of the plurality of second bottom portions has at least a first surface disposed in an inclined manner such that the closer it is to the light incident surface, the greater the height relative to the one surface of the base portion.

12. The light guide plate according to claim 11,
wherein a second tilt angle which is an angle between the first surface of each of the plurality of second bottom portions and the first direction, is smaller than the first tilt angle.

13. The light guide plate according to claim 11,
wherein an area ratio in a plan view between each of the plurality of second bottom portions and the convex lens adjacent to each of the second bottom portions is set between 4:6 and 1:9.

14. The light guide plate according to claim 11,
wherein each of the plurality of second bottom portions is disposed with a second surface that is inclined such that the closer it is to the light incident surface, the lower the height with respect to the one surface of the base portion, and/or has a third surface disposed substantially parallel to the first direction.

15. A light guide plate comprising:
a base portion having a one surface and a light incident surface disposed on one end side of the one surface and intersecting the one surface, and
a plurality of convex lenses provided on a side facing the one surface of the base portion, each of the plurality of convex lenses extending in a first direction and aligned along a second direction which is substantially orthogonal to the first direction,
wherein the base portion includes at least a first region relatively close to the light incident surface and a second region relatively far from the light incident surface,
wherein the first region is provided with a plurality of first bottom portions that are surfaces disposed between the convex lenses adjacent to each other in the second direction and inclined with respect to the first direction,
wherein the plurality of convex lenses are provided within the first region,
wherein, in the second region, a plurality of second bottom portions which are surfaces respectively disposed between the convex lenses adjacent in the second direction are provided, and
wherein each of the plurality of second bottom portions has at least a first surface disposed in an inclined manner such that the closer it is to the light incident surface, the greater the height relative to the one surface of the base portion.

16. The light guide plate according to claim 15,
wherein a second tilt angle which is an angle between the first surface of each of the plurality of second bottom portions and the first direction, is smaller than the first tilt angle.

17. The light guide plate according to claim 15,
wherein an area ratio in a plan view between each of the plurality of second bottom portions and the convex lens adjacent to each of the second bottom portions is set between 4:6 and 1:9.

18. The light guide plate according to claim 15,
wherein each of the plurality of second bottom portions is disposed with a second surface that is inclined such that the closer it is to the light incident surface, the lower the height with respect to the one surface of the base portion, and/or has a third surface disposed substantially parallel to the first direction.

* * * * *